United States Patent [19]

Weise et al.

[11] 4,225,195
[45] Sep. 30, 1980

[54] PROCESS AND DEVICE FOR THE REGULATION OF BRAKING PRESSURE IN LOCK-UP PROTECTION SYSTEMS

[75] Inventors: Lutz Weise, Misburg; Peter Liermann, Gehrden, both of Fed. Rep. of Germany

[73] Assignee: Wabco Westinghouse GmbH, Hanover, Fed. Rep. of Germany

[21] Appl. No.: 909,867

[22] Filed: May 26, 1978

[51] Int. Cl.³ .............................................. B60T 8/08
[52] U.S. Cl. .................................. 303/106; 303/103; 303/105
[58] Field of Search .................. 188/181; 303/20, 103, 303/105, 106, 110

[56] References Cited

U.S. PATENT DOCUMENTS

| | | | |
|---|---|---|---|
| 3,677,609 | 7/1972 | Davis et al. | 303/20 X |
| 3,790,227 | 2/1974 | Dozier | 303/20 X |
| 3,888,550 | 6/1975 | Reinecke et al. | 303/20 X |
| 3,930,688 | 1/1976 | Rau et al. | 303/20 X |
| 4,005,910 | 2/1977 | Leiber et al. | 303/106 X |
| 4,054,328 | 10/1977 | Leiber et al. | 303/103 |

Primary Examiner—Trygve M. Blix
Assistant Examiner—Reinhard J. Eisenzopf
Attorney, Agent, or Firm—G. J. Falce; R. W. McIntire, Jr.

[57] ABSTRACT

A process and apparatus for regulating the operator-controlled brake pressure of a vehicle wheel to prevent wheel lock-up by sensing a lock-up tendency and independently varying the operator-controlled brake pressure at the skidding wheel during successive cycles of wheel skid control. The sensed wheel behavior is monitored by an evaluation circuit which measures the duration of brake pressure reapplication with constant gradient during an initial cycle, provides a time period during a subsequent cycle that is a predetermined time duration less than the time duration of reapplication pressure in the initial cycle, and following expiration of the reduced time duration, establishes reapplication of pressure with a pressure gradient lower than the gradient during the initial cycle, whereby the reapplication pressure during control cycles subsequent to the initial control cycle is with a stepped gradient.

15 Claims, 7 Drawing Figures

PROCESS AND DEVICE FOR THE REGULATION OF BRAKING PRESSURE IN LOCK-UP PROTECTION SYSTEMS

The invention concerns a process and a device for the regulation of reapplication braking pressure in wheel lock-up protection systems during successive cycles of wheel skid control, by establishing variable timing periods for the high and low reapplication pressure gradients.

The purpose of the invention is to overcome the well-known hysteresis of braking force and to prevent overtravel for the purpose of achieving an optimal utilization of braking force.

A device of the above-named type has become known through German Pat. (DT-OS) No. 23 07 368, by means of which, in the pressure-build-up phase, the braking-pressure increase is completed in two different augmentations. In dependence on measurements of the braking pressure, in a time-control stage a certain initial time is determined at which the full braking pressure is admitted, after which a reduced braking pressure is admitted. A disadvantage is that a separate pressure sensor must be provided for each wheel, thus causing relatively high construction costs. Further, such pressure sensors are delicate, and there is the danger of erroneous measurements.

In German Pat. (DT-OS) No. 24 60 904 a system has become known, in which the duration of the pressure build-up is measured in a preliminary control cycle in which provision is made continuously for a short time interval with a large pressure gradient and a long time interval with a small pressure gradient and the duration of the pressure rise with large pressure gradient is varied in dependence of the pressure-build-up time with small pressure gradient. A disadvantage is that in the case of braking at high coefficient of friction with vehicles having relatively large hysteresis of braking force, as is quite generally the case in utility vehicles, the relatively long pressure-build-up phase with small pressure gradient leads to underbraking.

The German Pat. Nos. 21 64 094 and 22 05 787 describe the measurement and holding of the control pressure and the admission of the full braking force as a function of the measured control pressure, such that below a certain value of this control pressure, pressure is admitted at the smaller pressure gradient. Also in this process it is necessary to have for each wheel a pressure sensor as has already been described as disadvantageous above. The result is a system that is expensive to construct and is relatively delicate, leading to the danger of incorrect measurements.

The task of the present invention consists then in improving a process and a device of the type named above, in such a way that the above-described disadvantages do not appear, and especially so that the braking-force hysteresis is better overcome, thus better preventing overtravel. Further it will be easier to determine the friction values for the purpose of affecting the control signals as a function of the friction values.

In accordance with the invention, then, initially only the time $T_1$ of application with high pressure gradient is measured and used for the purpose of a reduction in the length of the application phase with high pressure gradient, wherein there is preferably measured the time between the appearance of the control signal for pressure increase and of the control signal for pressure reduction.

By means of the invention an optimal adaptive braking behavior is achieved. Underbraking is avoided with certainty because the time $T_2$ of application with high pressure gradient is optimally adjusted as a function of the friction value in all control cycles with avoidance of regulatory amplitudes large relative to the total time of the pressure-build-up phase, which is especially important for the initial control cycles of the braking process that has been initiated.

The electronic costs of the solution according to the invention are relatively low.

At a slight increase in cost the friction value can be determined from the measured $T_1$-time.

In accordance with a refinement of the invention, provision is made for measuring the pressure application time $T_1$ also in at least one further control cycle and for comparing it with the time $T_2$ so obtained in order to again reduce $T_2$ in case $T_2 \geq T_1$, to a value $T_2'$ ($T_2' < T_2$). By this means there is the possibility of correcting incorrect measurements in the first cycle due to friction-value variations and to errors caused by interference. In order to keep the constructions costs low this possibility of correction is preferably provided only for the second control cycle.

In the case of provision of multiple possibilities of correction, a percentage reduction of each measured total application time is to be preferred over reduction by a fixed, predetermined amount, for in the former case the danger of too strong a reduction of the application time $T_2$ for the high pressure-gradient is avoided.

The invention will now be elucidated in detail using the attached drawing, in which several examples of execution are represented.

Figure 1:
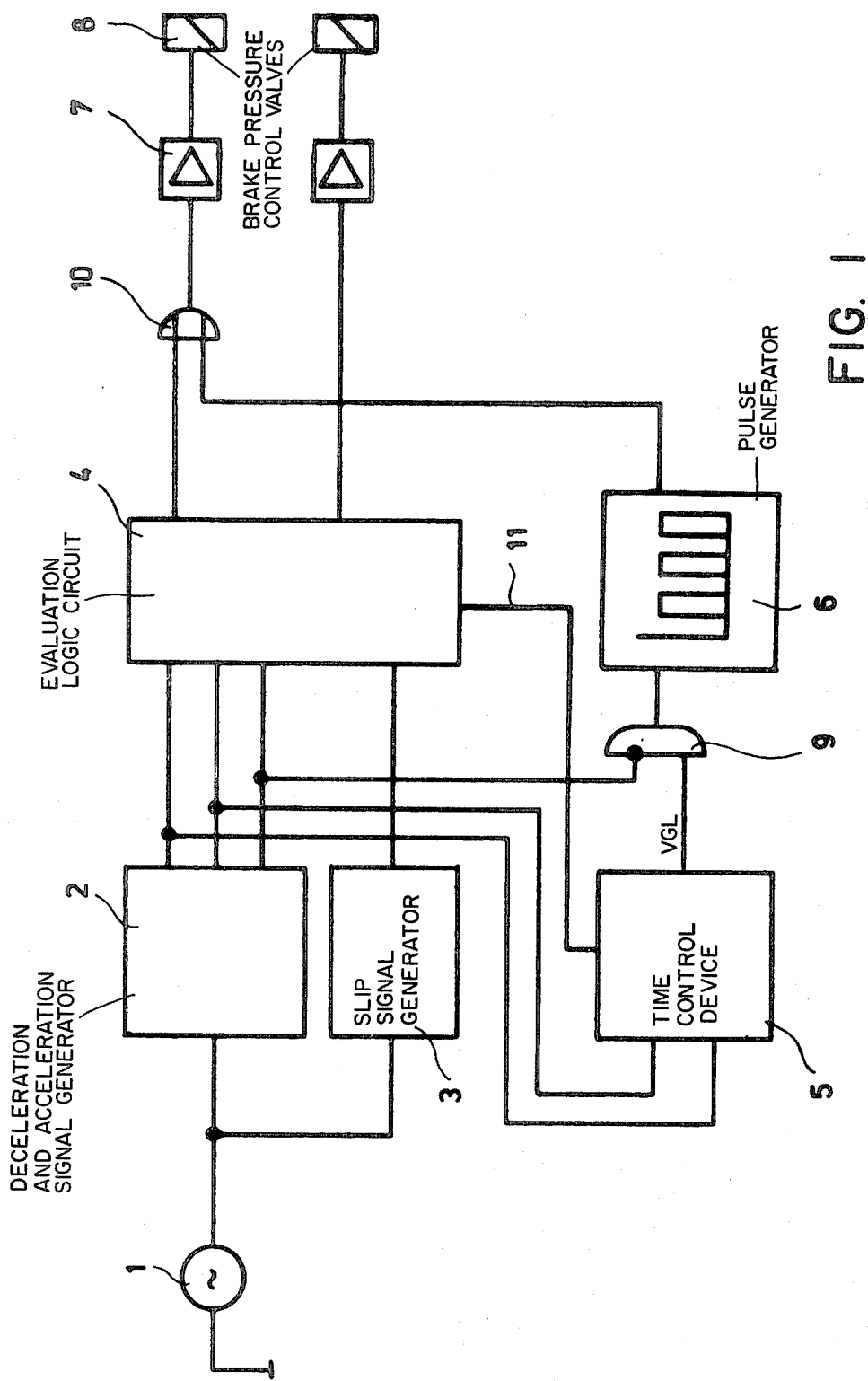
FIG. 1 shows a block diagram of a device for the regulation of brake pressure in lock-up-protection systems in accordance with the present invention.

The lock-up protection system according to FIG. 1 consists of several basic units, essentially as follows: a rotation pick-up 1 for sensing the turning of the wheel, a differentiating stage 2 for the purpose of obtaining deceleration and acceleration signals, a slippage-signal acquisition device 3, a logic circuit 4, a time control device 5, a device 6 for the reduction of the pressure gradient in the pressure application phase (for example, a pulse control circuit as indicated), a final stage amplifier 7, magnetic valves 8, gates 9 and 10 for the introduction of the control of devices 5 and 6 via corresponding gate functions in the signal flow. The logic circuit 4 and the time control device 5 are connected with each other via a line 11 containing a control signal for the time of controlled braking.

Figure 2:
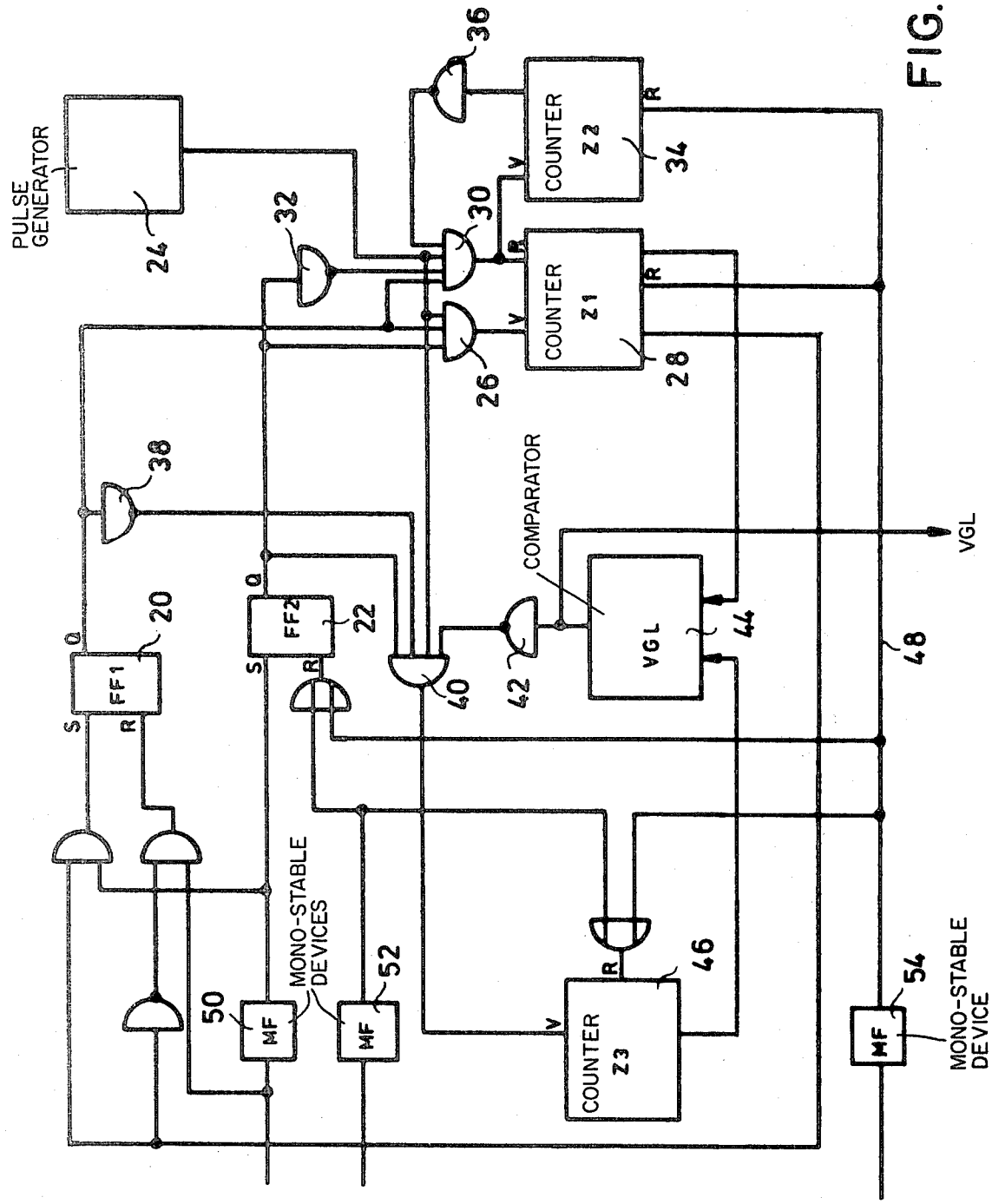
FIG. 2 is a block diagram of the time control device employed in the system according to FIG. 1, in which a definite, prespecified time is provided as the corrective quantity for the application time.
Figure 3:
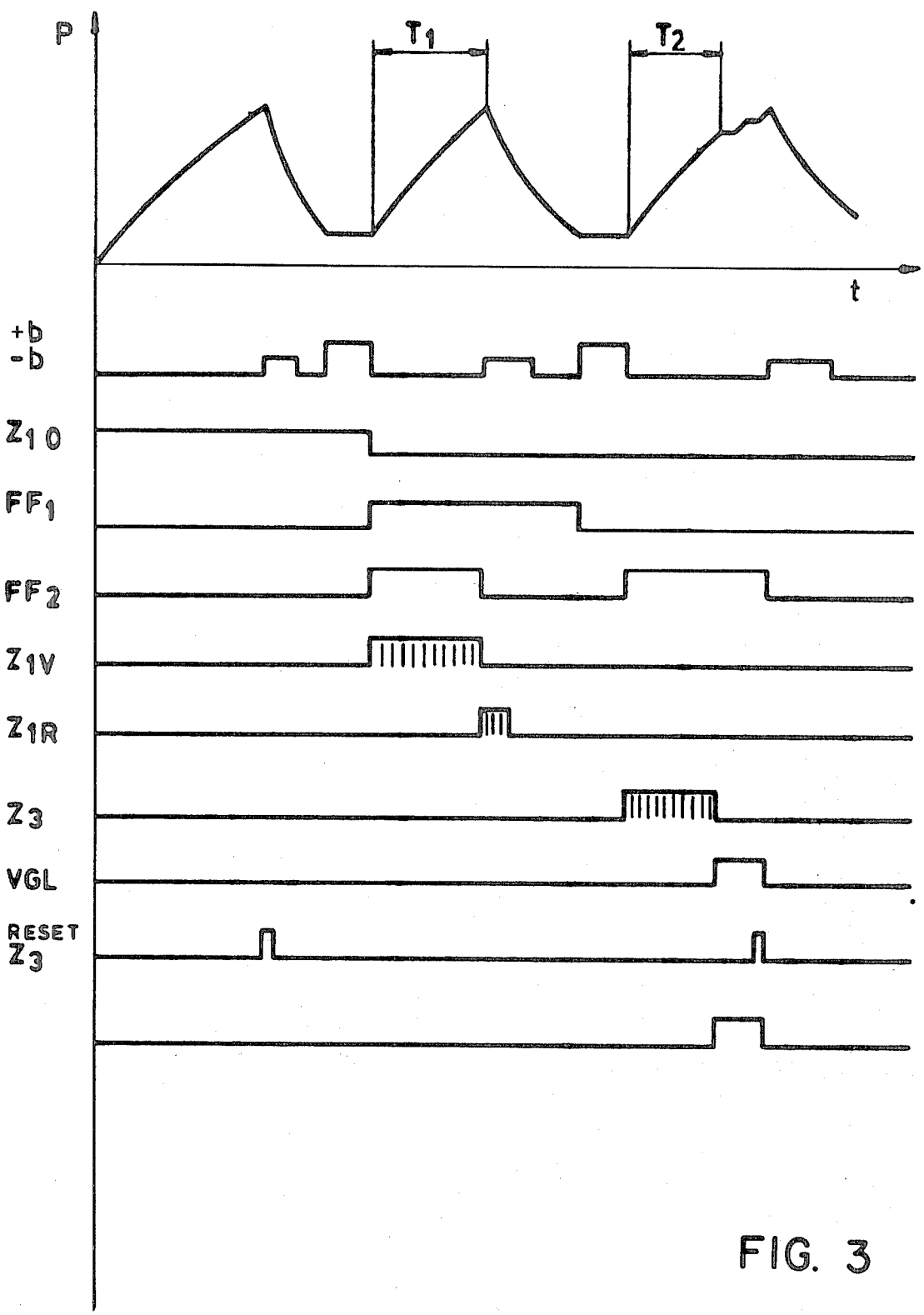
FIG. 3 shows schematically the signal and pulse diagram associated with the time control device according to FIG. 2.

Reference will now be made to FIG. 2, in which the time control device 5 according to FIG. 1 is represented in detail in the form of a block diagram. Reference will also be made to FIG. 3, in which is represented the signal and pulse diagram associated with the circuit according to FIG. 2.

With the aid of the time control device the braking force is to be regulated as a function of the instantaneous friction value or of the condition of the roadway. In order to achieve an optimal braking, effort is made to admit braking pressure with the maximal pressure gradient until just below the shut-off pressure and then to reduce the pressure gradient in order to reach the shut-off pressure relatively slowly, which can be accomplished by throttling by means of a diaphragm, by provision of a shunt controller, or by means of a pulsed or stepped increase of the pressure. Since, as is known, the level of the shut-off pressure is dependent on the condition of the roadway, i.e., on the friction value, the application time T1 in the pressure-build-up phase varies in dependence on the friction value.

After the initial braking phase (see FIG. 3), in the first control cycle the time T1 is measured from the beginning of the pressure increase, that is, from the decay of the acceleration signal ($+b \downarrow$), to the achievement of the shut-off pressure, that is, until the arrival of the deceleration signal ($-b \uparrow$), and subsequently the measured value T1 is reduced by a fixed amount $\Delta T$, resulting in a time $T2 = T1 - \Delta T$. In the control cycles following the first control cycle, after decay of the acceleration signal, pressure is applied with high pressure-gradient for a fixed period of time T2 in each case; at run-out of time T2, pressure is applied throttled, that is, with the smaller pressure gradient, until the shut-off pressure is reached. By this means there is achieved a rapid rise in braking pressure to the highest possible value, for the purpose of obtaining a large braking force, without any over-travel occurring.

In accordance with the circuit, the described regulation takes place as follows, where reference is made to both FIG. 2 and FIG. 3:

In the first control cycle a flip-flop 20 (FF1) is set, for the period of time from the trailing edge of the acceleration signal ($+b \downarrow$) to the leading edge of the next acceleration signal ($+b \uparrow$). A further flip-flop 22 (FF2), in each control cycle is, set by the trailing edge of the acceleration signal ($+b \downarrow$) and reset by the leading edge of the deceleration signal ($-b \uparrow$), and is thus set for the period $+b \downarrow$ to $-b \uparrow$.

The outputs (Q) of flip-flops 20 and 22 and the output of a timing pulse generator 24 are applied to an AND-gate 26, the output of which is connected with the count-up input V of a counter 28 (Z1). By means of this AND-connection of the output signals of flip-flops 20 and 22 and of the timing-pulse generator 24, the counter measures the number of pulses (Z1V) occurring in the time the flip-flop 22 is set (from $+b \downarrow$ to $-b \uparrow$), thus in the period T1 of the pressure-application phase in the first control cycle (cf. also FIG. 3 -Z1V).

As soon as the signal $-b \uparrow$ occurs, the flip-flop 22 (FF2) is reset. Via a second AND-gate 30, the output signal of flip-flop 20, via an inverter 32 the output signal of flip-flop 22, and the output signals of the timing-pulse generator 24 are connected to each other. The output of the AND-gate 30 is connected to a count-down input R of a counter 28 and simultaneously to a count-up input V of a second counter 34 (Z2).

As long as the AND-condition is fulfilled at the AND-gate, the counter 34 would count up and the counter 28 would count down from the previously reached state of the counter (T1). Now counter 34 is so installed that it counts only as far as the counter state assigned to a fixed, prespecified time value $\Delta T$, and thus interrupts by itself the counting of the timing pulses, the interruption being effected via an inverter 36.

Thus, after interruption by counter 34, count 28 contains a number (Z3) representing a time T2, which corresponds to the application time T1 reduced by $\Delta T$ and represents the application time T2 with maximal pressure gradient necessary for the following control cycles (cf. Z1R in FIG. 3).

Before the second control cycle the flip-flop 20 is reset by the signal $+b \uparrow$.

The output of flip-flop 20 is applied via an inverter 38 to an AND-gate 40, which is also connected to flip-flop 22, with the timing-pulse generator 24, and via an inverter 42 with the output of a comparator 44. The comparator is supplied with the outputs of counter 28 and of a third counter 46, to which are fed, via the AND-gate 40, the timing pulses from generator 24. By means of the AND connection the counter 46 counts up until the comparator 44 establishes equality between the status of the counter 28 and the status of counter 46. Via an inverter 42, the comparator then blocks further counting by counter 46, so that the time T2 is contained in counter 46.

The output signal from the comparator 44 also addresses the control device 7 (see FIG. 1) for the purpose of admitting pressure with a lower pressure gradient until the appearance of the deceleration signal ($-b \uparrow$), which resets counter 46 (cf. FIG. 3: VGL [=comparator] Z3, Reset Z3), after which the device according to the invention is ready for the next control cycle.

If the entire control process is finished, then the above-mentioned control signal associated with the controlled braking decays, whereby all counters are reset via line 48.

The mono-flip-flops 50 to 54 represented in FIG. 2 serve in the evaluation of the edge conditions of the corresponding signals.

Figure 4:
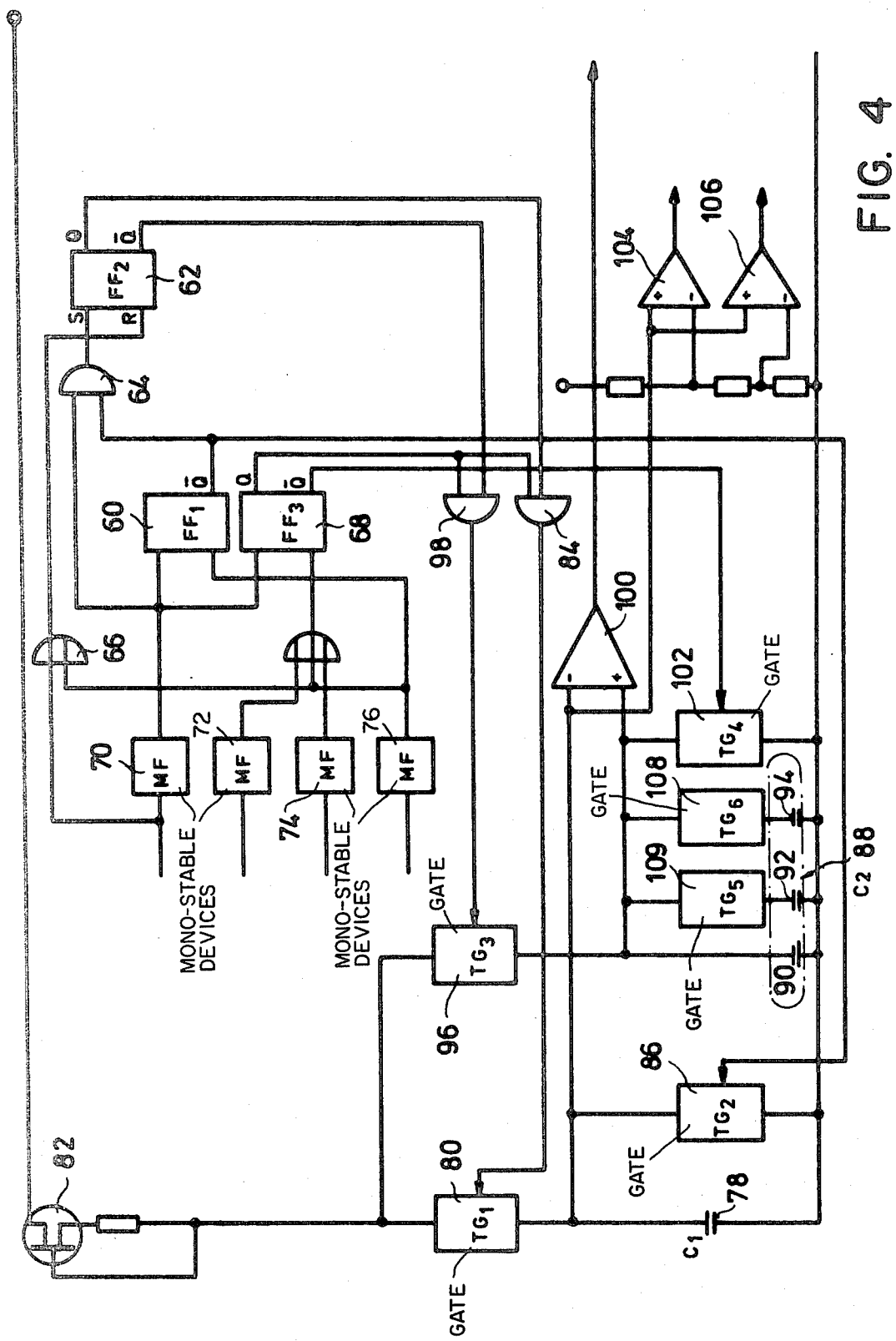
FIG. 4 shows a block diagram of a further form of execution of the time control device according to the invention, in which the corrective quantity in each case is a certain percentage of the measured time of application.
Figure 5:
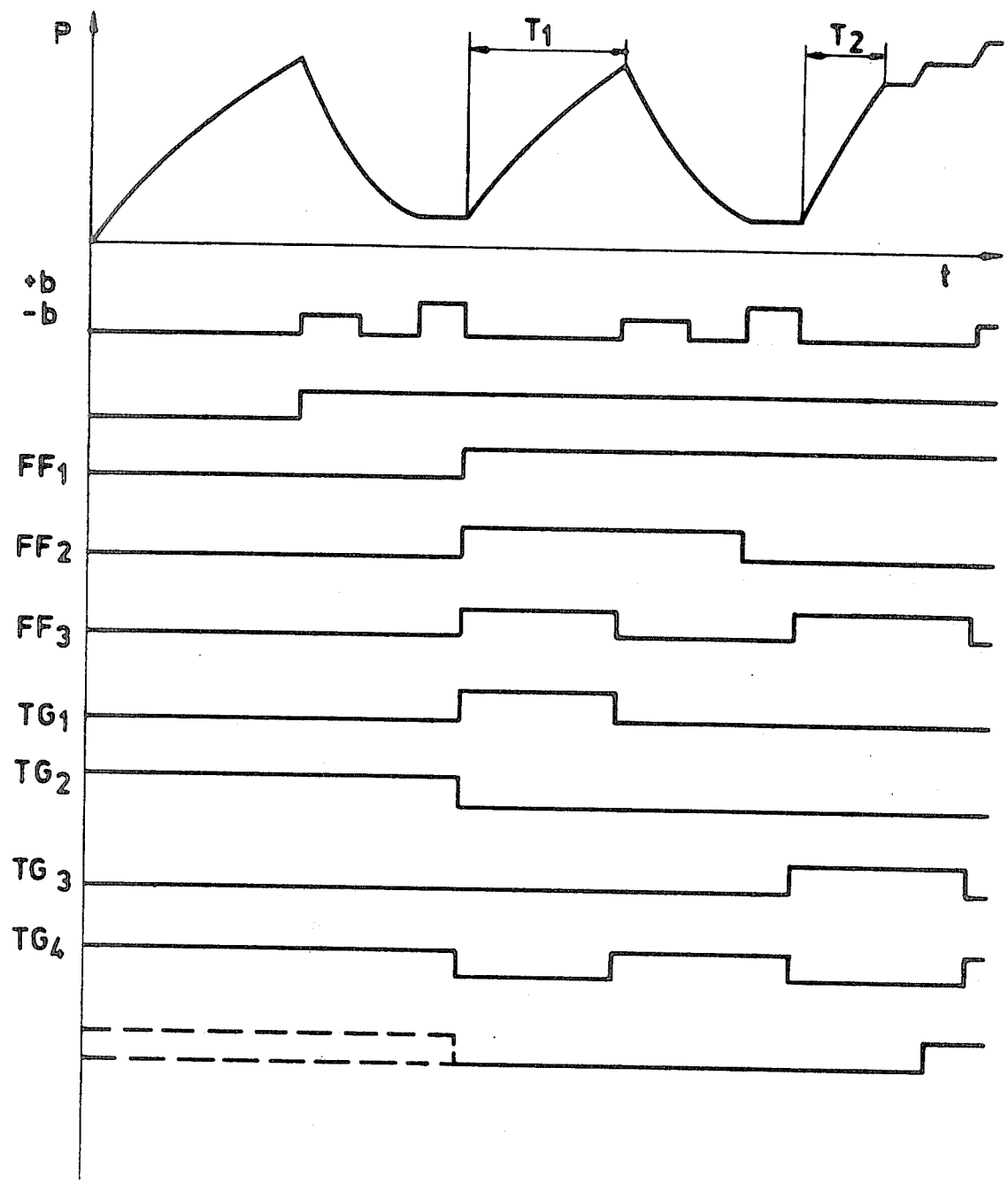
FIG. 5 shows schematically the signal and pulse diagram associated with the time control device according to FIG. 4.

Reference will now be made to FIGS. 4 and 5.

The arrangement shown in FIG. 4 works in principle like that according to FIG. 2. With the aid of this arrangement the application time T1 is to be reduced by a percentage value to a time T2 in accordance with the friction value.

In the first control cycle a flip-flop 60 (FF1) is set, for the entire period of braking control. A second flip-flop 62 (FF2) is set only in the first control cycle, from the decay of the acceleration signal ($+b \downarrow$) to the arrival of the next acceleration signal ($+b \uparrow$), where the setting is effected via an AND-gate 64 only when the AND-condition $+b \downarrow$. ($\overline{Q}$ of flip-flop 60 "HI" = $\overline{FF1}$) is fulfilled, and where resetting is effected by the provision to an OR-gate 66 of the $+b \uparrow$ signal or of the trailing edge of the control signal associated with the "controlled braking process." A third flip-flop 68 (FF3) is set in each control cycle during the time from the +b ↓ signal to the −b ↑ signal or λ-signal (slippage signal). Mono-flip-flops 70 to 76 are provided for the gating of the edge conditions.

For the measurement of the application time T1 in the first control cycle a capacitor 78 (C1) is provided for that can be charged by a constant current source 82 via an addressable transmission gate 80 (TG1), where the level of the voltage across the condenser corresponds to the time T1. The transmission gate 80 is addressed via an AND-gate 84 when the Q outputs of both flip-flops 68 and 62 are high. In this way it is ensured that the capacitor 78 measures only the time T1 of the first control cycle. The capacitor 78 is discharged before each control process with the help of a transmission gate 86 (TG2).

In the further control cycles the application time T2 with high pressure-gradient is obtained and regulated with another capacitor 88 (C2) or with one or more of the additional capacitors 90, 92, 94 ($C2_1$, $C2_2$, $C2_3$), the capacity (or capacities) of which is (or are) smaller than the capacity of capacitor 78 by a percentage value corresponding to the desired percentage of reduction of the time T1 measured in the first control cycle; the ratio of the capacity of capacitor 88 to that of capacitor 78 yields the desired percentage.

For the following explanations using FIG. 5, only one capacitor 88 (C2) should be considered. The arrangement chosen in FIG. 4, consisting of several parallel capacitors 90 to 94 ($C2_1$ to $C2_3$) serves for the adjustment to various friction values by the corresponding connection or disconnection of parallel capacitors.

Capacitor 88 (C2) is connected with a constant-current source 82 via a transmission gate 96 (TG3). The transmission gate 96 is addressed via an AND-gate 98 that is connected with the $\overline{Q}$-output of flip-flop 62 (FF2) and with the Q-output of flip-flop 68, and is active only when flip-flop 62 is reset and flip-flop 68 is set. In this way it is assured that the transmission gate 96 permits the charging of capacitor 88 only during the pressure application phase.

The voltages of capacitors 78 and 88 are compared in a comparator 100. In the charging of capacitor 88, as soon as the comparator establishes equality of the two voltages, it emits a control signal that is directed to the device 6 according to FIG. 1 for the purpose of applying pressure with a smaller pressure gradient until the shut-off pressure is reached (see FIG. 5-comparator output). The voltage across capacitor 88 equal to the voltage across capacitor 78 is reached in a fairly short time, for the capacity of capacitor 88 is selected to be smaller than that of capacitor 78, so that in this way a percentage reduction of the application time T1 to T2 is effected.

Flip-flop 68 (FF3) will be reset each time at the appearance of the acceleration signal (−b ↑) or of the slippage signal λ ↑. The signal appearing at the output $\overline{Q}$ is applied to a transmission gate 102 (TG4), which discharges the capacitor 88 not only after the completion of the entire controlled braking process but also after each control cycle.

For closer adjustment to the condition of the roadway, as mentioned at the beginning, additional threshold stages 104, 106 can be provided for, by means of which the capacitors 92 to 94 may be connected by means of the transmission gates 108 and 109 for the purpose of varying the values of the percentage change.

Figure 6:
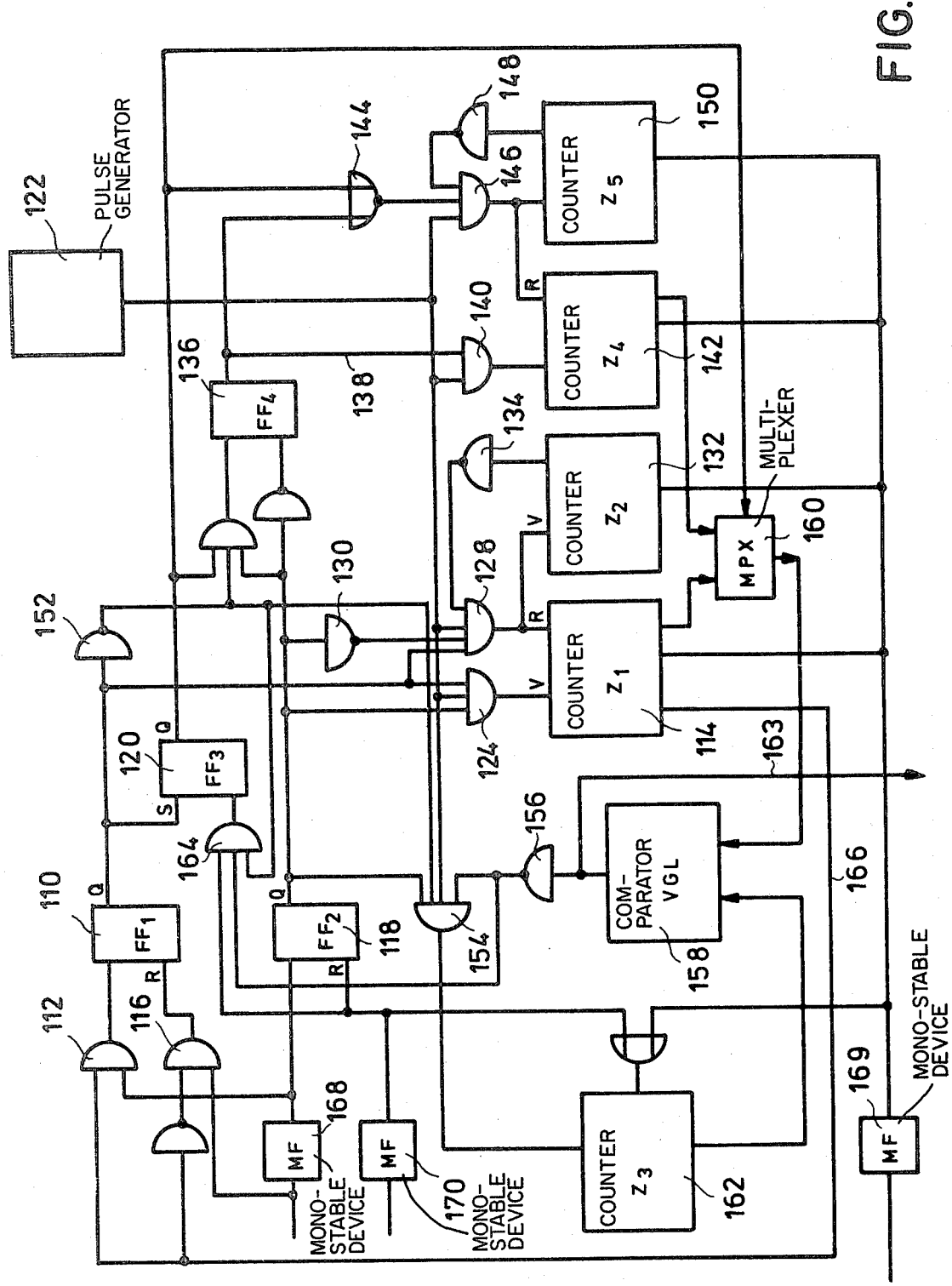
FIG. 6 is a block diagram of a further form of execution of the time control device, in which it is also determined whether the control pressure is reached within or outside of the corrected application time with high pressure-gradient.
Figure 7:
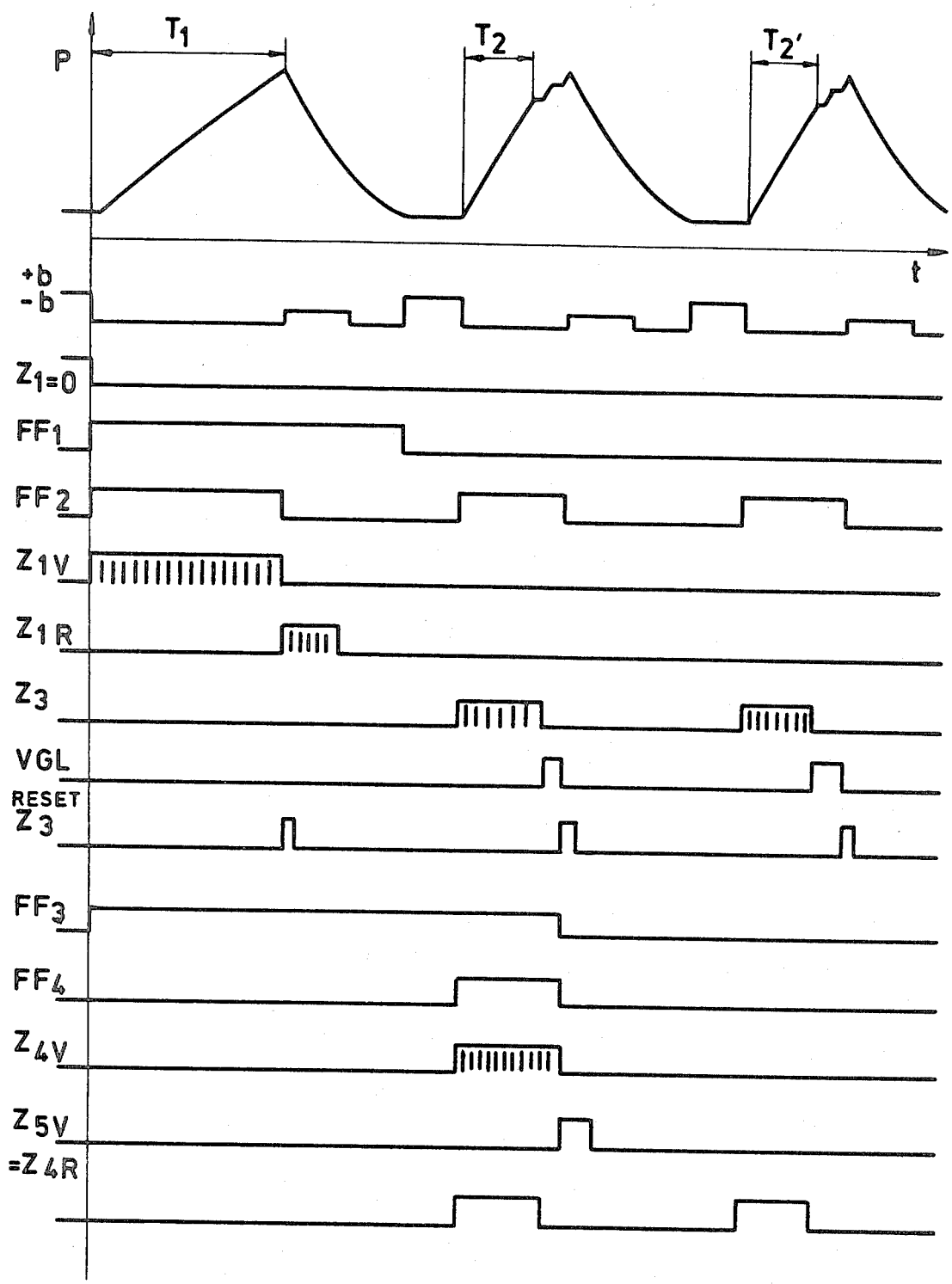
FIG. 7 shows schematically the signal and pulse diagram associated with the time control device according to FIG. 6.

Reference will now be made to FIGS. 6 and 7, which are concerned essentially with a further development of the examples of execution of the present invention according to FIGS. 2 to 5, which further permit the monitoring of the application times in the control cycle following the first control cycle in that it is established whether the shut-off pressure is reached within the application period with high pressure-gradient or after this period has expired. If the shut-off pressure is reached before the end of the period, then this in an indication that the undertaken reduction of the time of application on the basis of the application-time measurement in the first control cycle, to be applied in further control cycles, was erroneous or that an abnormally high friction-value change has occurred, because of which a further decrease of the application time with high pressure-gradient is required.

The circuit arrangement according to FIG. 6 works in principle like that according to FIG. 2, so that to complement the executions that follow reference may be made to the functional descriptions of the devices according to FIGS. 2 and 3.

After the initial braking phase (cf. FIG. 7), in the first control cycle the time T1 from the +b ↓ signal to the −b ↑ signal is measured. For this purpose, in the first control cycle a first flip-flop 110 (FF1) is set via an AND-gate 112 at the decay of the acceleration signal (+b ↓) and at the zero-count state of a counter 114 (Z1), the significance of which will be elucidated in more detail below. The flip-flop 110 is reset at the appearance of the next acceleration signal (+b ↑) (cf. FIG. 7-FF1). Thus the flip-flop 110 is only set in the first control cycle.

A second flip-flop 118 (FF2) is also set by the +b ↓ signal and reset at the appearance of the deceleration signal (−b ↑); that is, flip-flop 118 is set in every control cycle between +b ↓ and −b ↑.

A third flip-flop 120 is also set with the setting of flip-flop 110, in deviation from the form of execution according to FIG. 2, in that the Q-output of flip-flop 110 is connected with the set-input of flip-flop 120. The resetting of flip-flops 110 and 118 occurs temporally as in the arrangement according to FIG. 2: first flip-flop 118 is reset and then flip-flop 110.

The Q-outputs of flip-flops 110 and 118 and the output of a timing-pulse generator 122 are applied to an AND gate 124, the output of which is connected to the count-up V of counter 114 (Z1). By means of this AND-connection of the output signals of flip-flops 110 and of the timing-pulse generator 122, the counter measures the number of pulses (Z1V) that occur in the time when the flip-flop 118 is set (from +b ↓ to −b ↑), and therewith the time T1 of the time-pressure build-up phase in the first control cycle (cf. also FIG. 7-Z1V).

As soon as the −b ↑ signal appears, the flip-flop 118 (FF2) is reset. Via a second AND-gate 128, the output signal of flip-flop 110, the output signal of flip-flop 118 via an inverter 130, and the output signals of the timing-pulse generator 122 are combined. The output of this AND-gate 128 is applied to the count-down input R of counter 114 and simultaneously to the count-up input V of a second counter 132 (Z2).

As long as the AND-condition is fulfilled at the AND-gate, counter 132 would count up and counter 114 would count down from the previously-reached counter-status (T1). Now counter 132 is so installed that it counts only upto a counter-status that is associated with a fixed, prespecified time value ΔT, therewith of its own action interrupting the counting of the timing pulses, this interruption being effected via an inverter.

After interruption by counter 132, the counter 114 contains a number (Z1R) that represents a time T2 corresponding to the application time T1 reduced by ΔT, which represents the application time T2 with maximal pressure gradient necessary for the following control cycles (cf. Z1R in FIG. 7).

Before the second control cycle the flip-flop 110 is reset by the +b ↑ signal.

With the renewed setting of flip-flop 118 in the second control cycle by means of the +b ↓ signal, a fourth flip-flop 136 is set by the logical combination of the output signal of flip-flops 110 and 118 and 120, where the condition is $\overline{FF1} \times FF2 \times \overline{FF3}$ (cf. also FIG. 7-FF3). The resetting is effected with the resetting of flip-flop 118, i.e., flip-flop 136 is set only for the period of time when flip-flop 118 remains set.

With the setting of flip-flop 136 an AND-gate 140 is addressed via a connection 138, by means of which, for the period of time in which flip-flop 136 is set, counting pulses from the timing-pulse generator 122 are counted in a counter 142 (Z4) via the count-up input V (cf. FIG 7-FF4 and Z4V). The counter 142 thus "measures" the application time T1' of the second control cycle (see FIG. 7).

After the resetting of flip-flop 136, that is, at the appearance of the −b ↑, and after the resetting of flip-flop 118, via a logic circuit consisting of 144, 146, and 148, the timing pulses of the counting-pulse generator 122 are counted up by a further counter 150 (Z5) and at at the count-down input R of counter 142 (Z4). The counter 150, like counter 132, has a count-limiting function, so that this counter 150 counts to a definite, settable value corresponding to a value ΔT'≦ΔT. At this value, i.e., at the pulse number corresponding to this value, the counter 142 counts down, so that at the end of the counting the counter status stops at the value T2', the application time T1' reduced by ΔT' (cf. FIG. 7−Z5V=Z4R).

The Q-output of flip-flop 110 is applied, via an inverter 152, to an AND gate 154, which is also connected with the Q-output of flip-flop 118, with the timing-pulse generator 122, and, via an inverter 165, with a comparator stage 158.

Comparator 158 is fed by the counters 142 and 114, via a multiplexer, and by an additional counter 162, which is fed via the AND-gate 154 with the timing pulses from the timing-pulse generator 122. By means of the AND-connection, the counter 162 counts until the comparator establishes equality between the count status of counter 114 and the count state of the counter 162. Via an inverter 156, the comparator then blocks the further counting in counter 162, so that counter 162 contains the time T2.

The output signal of the comparator 158 also addresses, via connection 163, the control device 6 (see FIG. 1) for the purpose of admitting pressure with a lower pressure-gradient until the appearance of the deceleration signal (−b ↑), which resets the counter 162 (cf. FIG. 7-VGL, Z3, Reset z3), after which the device according to the invention is prepared for the next control cycle.

If the comparator stage is not operative because the shut-off pressure has been reached before the end of the period T2 or before counter 162 reaches the count state of the counter 114, the flip-flop 120 is reset, by the corresponding AND-combination of the deceleration signal, of the inverted output signal of the comparator, and of the inverted output signal of flip-flop 110 by means of an AND-gate 164. If the comparator is inoperative in the second or a following control cycle, but the −b ↑ signal appears, then the AND-gate 164 is operative and resets the flip-flop 120; the corresponding AND-combination is (−b ↑)·$\overline{FF1}$·$\overline{VGL}$ (cf. FIG. 7-FF3).

The Q-output of flip-flop 120 is connected with the multiplexer 160. Via this multiplexer the flip-flop 120 switches off the counter 114 (Z1) and switches the counter 142 to the comparator 158, which means that for the next control cycles the count status of counter 162 is each time compared with the count status of counter 142, which corresponds to the application time T2'.

For the following control cycles the flip-flops 110, 120, and 136 now remain reset.

Only flip-flop 118 is set by the +b ↓ signals and reset by the −b ↑ signals in the control cycles following the second control cycle.

The admission of pressure with lower pressure-gradient, according to the form of execution of FIG. 6, takes place either after the run-out of time T2 by comparison of the count status of counter 162 with the count status of counter 114, if the comparator is operative in the second control cycle, or after run-out of time T2'>T2 by comparison of the count status of counter 162 with the count status of counter 142, if the comparator is not operative in the second control cycle.

If the entire control process is ended, then the above-mentioned control signal associated with controlled braking, which appears on line 11 (see FIG. 1), decays, whereby all counters are reset by line 166. The mono-flip-flops 168, 169, and 170 represented in FIG. 6, as in the forms of execution according to FIGS. 2 and 4, serve in the gating of the edge conditions of the corresponding signals.

For the sake of completeness it should be mentioned that obviously in the forms of execution according to FIGS. 2 and 6, in analogy with the execution form according to FIG. 4, the slippage signal may be used for control.

Obviously the arrangement according to FIG. 6 can also be executed in such a way that instead of comparison being made between the first and the second control cycles, rather the first and the third or the first and the fourth are compared. Also, at a correspondingly higher cost, correction of the application time can be provided for for each cycle, in the direction of an increase as well as of a reduction of the application time with high pressure-gradient.

The principle of regulation according to FIG. 6 can obviously also be transformed into the arrangement according to FIG. 4, where instead of a variation by a constant amount, provision is made for a percentage change in the application time measured in the first control cycle.

In the form of execution according to FIG. 6 there is measurement of the application time again in the second control cycle, in order to be able to correct at least once the reduced application time T2 obtained from the measurement in the first control cycle, in case T2 should have turned to be too large due to erroneous measurement, due to variation of the friction value, or due to a disturbance.

For the further illustration of the invention, some measurements and examples of the "corrective quantities" provided in accordance with the invention will be given below:

1. At a friction value of $\mu<0.25$ the application time is about 25 ms; in this case the percentage reduction would amount to 30%, i.e., in the following control cycles pressure would be admitted with high pressure-gradient durung 70% of the entire application time T1.

2. At a friction value $0.25 <\mu<0.6$, there results an application time of about 55 ms; in this case the percentage reduction would amount to 20%, i.e. pressure is admitted with large pressure gradient during 80% of the total application time T1 in the following control cycles.

3. With a friction value $\mu>0.6$ the resulting application time is about 90 ms; in this case the percentage reduction would amount to about 15%, i.e., during 85% of the entire application time T1 in the following cycles, pressure would be admitted with large pressure-gradient.

For adaptation to the friction value, as was already mentioned in connection with FIG. 6, the capacitor 88 (C2) can be chosen variably in that, as already explained, several capacitors may be arranged so as to be connectable and disconnectable. The capacitors may be staggered as follows, for example: $C2_1 = 0.7 \cdot C1$, $C2_2 = 0.1 \cdot C1$, and $C2_3 = 0.05 \cdot C1$.

The analog circuit according to FIG. 4 can be realized in an equivalent form digitally.

We claim:

1. A process for the regulation of vehicle brake pressure in a wheel skid control system consisting of the steps of: measuring the rotational velocity of a vehicle wheel; differentiating said measured wheel velocity to obtain wheel acceleration and deceleration rates; comparing said wheel acceleration and deceleration rates with different threshold values to obtain wheel acceleration, deceleration, and slip control signals; regulating the wheel brake pressure during an initial cycle of wheel skid control in accordance with said acceleration, deceleration, and slip control signals, so that the reapplication of said brake pressure is with a constant gradient; measuring the duration of said brake pressure reapplication during said initial wheel skid control cycle to establish a time period T1; reducing said time period T1 to establish a time period T2 that is shorter in duration than said time period T1; and reapplying said brake pressure during at least one subsequent cycle of wheel skid control, so that, upon expiration of said time period T2, the gradient of said brake pressure is reduced relative to the gradient during said time period T2 to obtain a stepped reapplication pressure gradient.

2. The process as recited in claim 1, characterized by the pulsing of said reapplication brake pressure following expiration of said time period T2 to provide said reduced pressure gradient.

3. The process as recited in claim 1, further consisting of the step of: measuring a time period T1' for the duration of said reapplication brake pressure during said at least one subsequent wheel skid control cycle; comparing said time period T1' with said reduced time period T2 of said at least one subsequent control cycle; and establishing a further time period T2', that is shorter in duration than said time period T2, during which the low pressure gradient of brake pressure reapplication is provided in a different subsequent control cycle, in the event said time period T1' expires prior to expiration of said time period T2.

4. The process as recited in claim 3, further characterized in that the reduction of said time period T1 is by a first predetermined value and the reduction of said time period T2 is by a second predetermined value that is less than said first predetermined value.

5. The process as recited in claim 3, further characterized in that the reduction of said time period T1 is by a first predetermined percentage and the reduction of said time period T2 is by a second predetermined percentage that is less than said first predetermined percentage.

6. A wheel skid control system for regulating vehicle brake pressure having a wheel sensor to detect the rotational velocity of a vehicle wheel; a differentiator to detect a rate of change of wheel velocity; means for providing acceleration, deceleration, and slip control signals when said rate of change of wheel velocity exceeds different predetermined threshold values; valve means for controlling brake pressure; evaluation circuit means for operating said valve means in accordance with said control signals; whereby the reapplication of brake pressure during an initial cycle of wheel skid control follows a constant pressure gradient; time control means for measuring a time period T1 between initiation and termination of said reapplication of brake pressure during said initial wheel skid control cycle and further providing a time period T2 during a subsequent wheel skid control cycle that is shorter in duration than said time period T1; control means operative independently of said evaluation means for reducing said gradient of said reapplication brake pressure; and said time control means including means for preventing operation of said control means during said time period T2 and effecting operation of said control means thereafter until expiration of said time period T1 to provide a brake pressure reapplication gradient during at least one subsequent wheel skid control cycle having a high pressure gradient initially and thereafter a low pressure gradient.

7. A system as recited in claim 6, wherein said control means comprises a pulse signal control circuit.

8. A system as recited in claim 6, further characterized in that said time period T1 is measured during the time interval between the appearance of said acceleration control signal in said initial cycle and appearance of said deceleration control signal immediately thereafter.

9. A system as recited in claims 6, 7, or 8, wherein said time control means further includes means for providing a predetermined time period $\Delta T$, by which duration said time period T1 is reduced to provide said time period T2.

10. A system as recited in claim 9, wherein said time control means comprises a first counter capable of forward and reverse operation, said first counter being operative in a forward direction to provide a count value representative of said time period T1 and operative in a reverse direction following expiration of said time period T1; and said means providing said time period $\Delta T$ including a second counter operative concurrently with said reverse operation of said first counter for a predetermined count representing said time period $\Delta T$, said reverse operation of said first counter being terminated by said second counter upon expiration of said time period $\Delta T$ to provide a count value representative of said time period T2.

11. A system as recited in claim 10, wherein said time control means further comprises a comparator having an output and at least two inputs; and a third counter operative responsive to said acceleration control signal during said subsequent wheel skid control cycle, said third counter being connected to one input of said comparator and said first counter being connected to the other input thereof, and said comparator output being connected to said pulse signal control circuit, so that, upon coincidence of said first and third counters, a signal is provided at said comparator output to effect operation of said pulse signal control circuit, in accordance with expiration of said time period T2.

12. A system as recited in claim 9, wherein said time control device comprises a supplemental means for establishing a time period T1' between initiation and termination of said reapplication of brake pressure during said subsequent wheel skid control cycle; means for providing a time period T2' during a cycle of wheel skid control following said subsequent cycle, said time period T2' being shorter in duration than said time period T2; and means for effecting operation of said control means to reduce said brake pressure reapplication gradient upon expiration of said time period T2' during said following control cycle, provided said reapplication of brake pressure in said subsequent control cycle preceding said following control cycle is terminated by the appearance of said deceleration signal prior to expiration of said time period T2.

13. A system as recited in claims 6, 7, or 8, wherein said time control means further includes means for providing a time period $\Delta T$ that is a predetermined percentage of said time period T1, by which percentage said time period T1 is reduced to provide said time period T2.

14. A system as recited in claim 13, wherein said time control means further comprises a voltage source; first capacitor means connected to said voltage source for providing said time period T1 in accordance with the time required to charge said first capacitor, second capacitor means connected to said voltage source during said subsequent wheel skid control cycle to provide said time period T2 in accordance with the time required to charge said second capacitor, said charging rate being greater than that of said first capacitor; and a comparator having a pair of inputs connected to said first and second capacitors, respectively, and an output connected to said pulse signal control circuit, so as to effect operation thereof only when the voltage of said first and second capacitors is equal, such time corresponding to expiration of said time period T2.

15. A system as recited in claim 14, further characterized in that the capacitance value of said second capacitor means is less than that of said first capacitor means.

* * * * *